Jan. 19, 1960     S. FALCETTI     2,921,744
COMBINED GARDEN HOSE GROUND SUPPORT AND NOZZLE
Filed April 14, 1958

INVENTOR.
Steve Falcetti
BY
L. S. Saulsbury
ATTORNEY

2,921,744

COMBINED GARDEN HOSE GROUND SUPPORT AND NOZZLE

Steve Falcetti, Forest Hills, N.Y.

Application April 14, 1958, Serial No. 728,391

1 Claim. (Cl. 239—276)

This invention relates to a combined garden hose ground support and nozzle.

It is the principal object of the present invention to provide a garden hose nozzle with a ground support therefor that is particularly adapted for use on small lawns and which sprays the lawn in a square pattern, whereby to prevent water waste on areas of the lawn and sidewalks that results when a circular spray is used.

It is another object of the invention to provide a combined ground support and nozzle in which the nozzle can be detachably secured to a double bent formation of the wire on the upper end of the support which will grasp and hold the hose against displacement from the support when once the hose has been positioned thereon.

It is a further object of the invention to provide a garden hose ground support which may be detachably secured to the nozzle and upon disconnection from the nozzle, it can be connected to the hose by a rubber band through which the lower end of the support can be extended and at its upper end by its U-shaped top portion that normally receives the nozzle.

It is a still further object of the invention to provide a combined ground support and nozzle in which the nozzle can be detachably pivotally connected to the upper end of the support in such a manner that the support can be pivoted from the nozzle and held clamped upon the hose by its top spring U-shaped portion in either its use or out of use positions.

Other objects of the invention are to provide a combined garden hose support and nozzle, having the above objects in mind, which is of simple construction, inexpensive to manufacture, has a minimum number of parts, light in weight, easy to assemble, efficient and effective in use.

Figure 2:
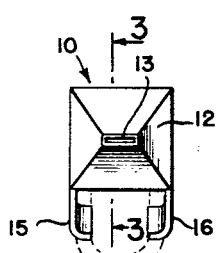
Figure 1:
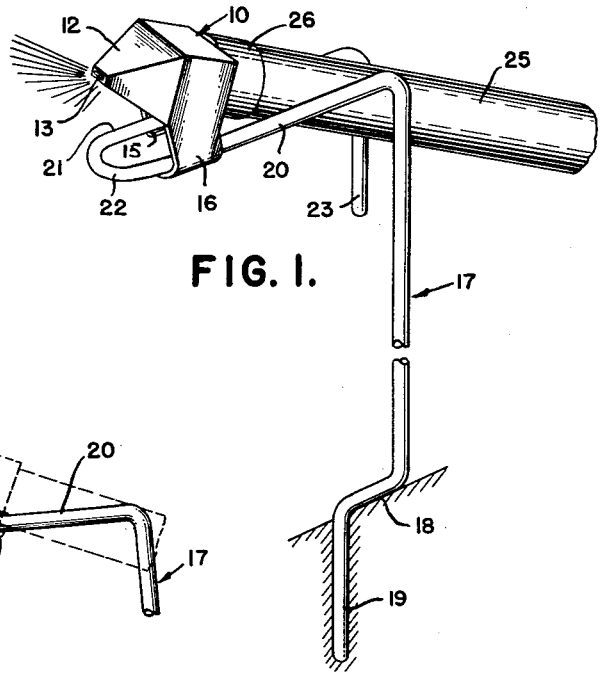
Figure 3:
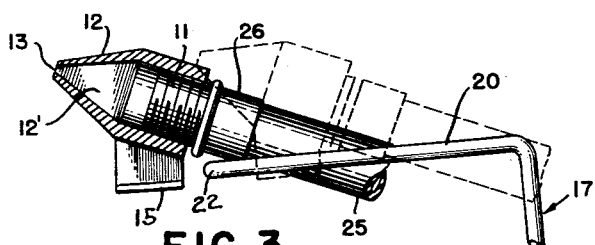
Figure 4:
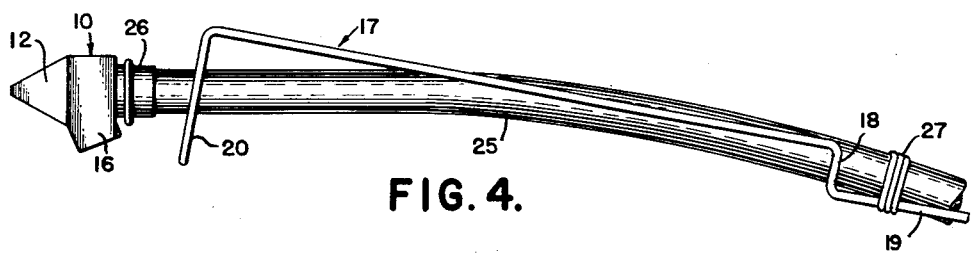
Figure 5:
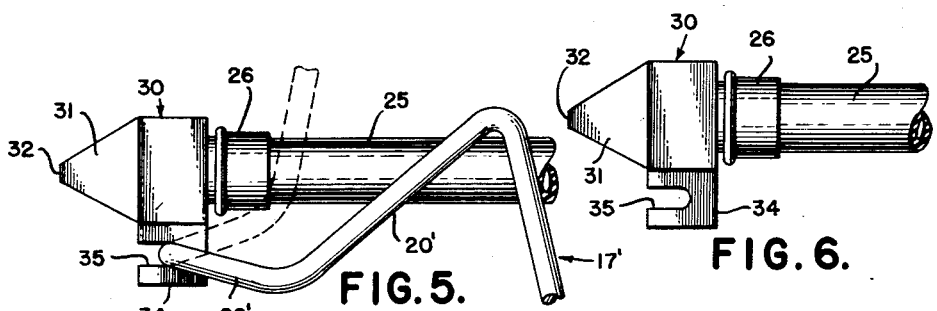
Figure 6:
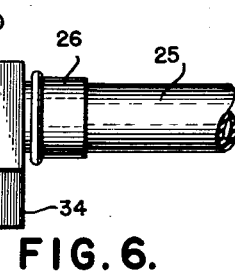
Figure 7:
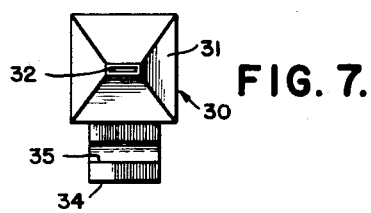

For a better understanding of the invention, reference may be had to the following detailed description taken in connection with the accompanying drawing, in which:

Figure 1 is a perspective view of the combined garden hose support and nozzle constructed according to one form of the invention, Fig. 2 is an end elevational view of the front of the nozzle, Fig. 3 is a longitudinal sectional view taken on line 3—3 of Fig. 2, Fig. 4 is a side elevational view of the support and attached to the hose separate from the nozzle and as carried thereon when not in use, Fig. 5 is a side elevational view of a combined garden hose support and nozzle constructed according to another form of the invention, Fig. 6 is a side elevational view of the nozzle separated from the support, and Fig. 7 is a front elevational view of the nozzle shown in Figs. 5 and 6.

Referring now particularly to Figs. 1 to 4, 10 represents a nozzle having a threaded inlet opening 11 and a forwardly-extending tapered square nozzle portion 12 with an elongated transverse slot spray outlet 13 from which the water is delivered in a square pattern to thereby lend nozzle for use on small lawns. Without this square pattern of water being delivered a great deal of water is wasted by overspraying the walks and as a result of double spraying in trying to fit together the circular spray patterns of the usual hose sprays. Depending from the nozzle are opposing spring finger extensions 15 and 16 by which the nozzle 10 is detachably secured to the ground wire garden hose support 17. This support has an off set portion 18 to limit the extent to which a ground-penetrating portion 19 can be sunk into the ground. A U-shaped top attaching portion is provided on the upper end of the support and has laterally-spaced spring legs 20 and 21 connected together by a bend 22 and drop leg extension 23 depends from the leg 21. This U-shaped attaching portion extends generally horizontally when supporting a hose 25. The hose 25 is then held clamped between the leg portions 20 and 21. The nozzle 10 is slid over these leg portions 20 and 21 by pulling the depending opposing finger extensions 15 and 16 thereover. The hose 25 is connected to the threaded opening of the nozzle 10 by a threaded fitting 26. The nozzle 10 will be held against forward displacement from the support 17 by the squeezing or clamping action of the legs 20 and 21 upon the sides of the hose.

When the hose is not in use the support 17 may be removed from the nozzle 10 and secured to the hose as shown in Fig. 4 by rubber bands 27 through which the ground penetrating portion 19 is extended and between the legs 20 and 21 of the top U-shaped portion.

According now to the form of the invention shown in Figs. 5, 6 and 7, there is provided a square nozzle 30 having a tapered nozzle end 31 of square section in the end of which there is a transversely-extending elongated slot 32. The nozzle 30 has a single depending portion 34 with a front transverse slot 35 that receives the bent up end 22' of a U-shaped attaching portion 20' of a ground support 17'. This top attaching portion 20' has a leg on the other side of the portion corresponding to the leg 21 of the support 17 with a depending leg portion 23 thereon. The nozzle is accordingly pivotally connected to the ground support and in either the use or the out-of-use position the ground support will be held upon the hose by the clamping action of the legs of the top portion and the nozzle while being detachably connected to the top portion and of the support can remain thereon. The top portion of the support thus serves to maintain the hose upon the support in both its use and its out-of-use positions and in the latter position when the ground support is folded upwardly on the nozzle as illustrated by the dotted lines in Fig. 5.

It should now be apparent that there has been provided a combined garden hose and ground support and nozzle therefor in which the nozzle is detachably connected to the ground support and the top portion to which the nozzle is detachably connected is so formed as to hold by its spring clamp action the nozzle against its displacement from the support.

It should also be apparent that this top attaching portion also supports the ground support upon the hose when in the out-of-use position.

While various changes may be made in the detailed construction, it shall be understood that such changes shall be within the spirit and scope of the present invention as defined by the appended claim.

What is claimed is:

A ground support for a garden hose and nozzle comprising a U-shaped wire top attaching portion providing spring legs to clampably retain the hose and a projection extending from one of the legs at right angles thereto, said projection being adapted to be sunk into the ground, a nozzle adapted to be secured to the end of the hose, said nozzle having means depending therefrom to connect the nozzle to the top attaching portion and to be held against displacement therefrom by the clamp connection of the hose with the top portion, and by said depending means which comprise opposing depending spring fingers detachably and tightly fitted around the top attaching portion of the ground support.

References Cited in the file of this patent

UNITED STATES PATENTS

| | | |
|---|---|---|
| 518,986 | Cain | May 1, 1894 |
| 533,113 | Byrkit et al. | Jan. 29, 1895 |
| 691,758 | Gay | Jan. 28, 1902 |
| 996,464 | Darst et al. | June 27, 1911 |
| 1,007,657 | Freund | Oct. 31, 1911 |
| 1,058,189 | McBoyle | Apr. 8, 1913 |
| 1,780,233 | Jenkins | Nov. 4, 1930 |

FOREIGN PATENTS

| | | |
|---|---|---|
| 23,541 | Australia | Apr. 16, 1930 |